Patented Nov. 10, 1953

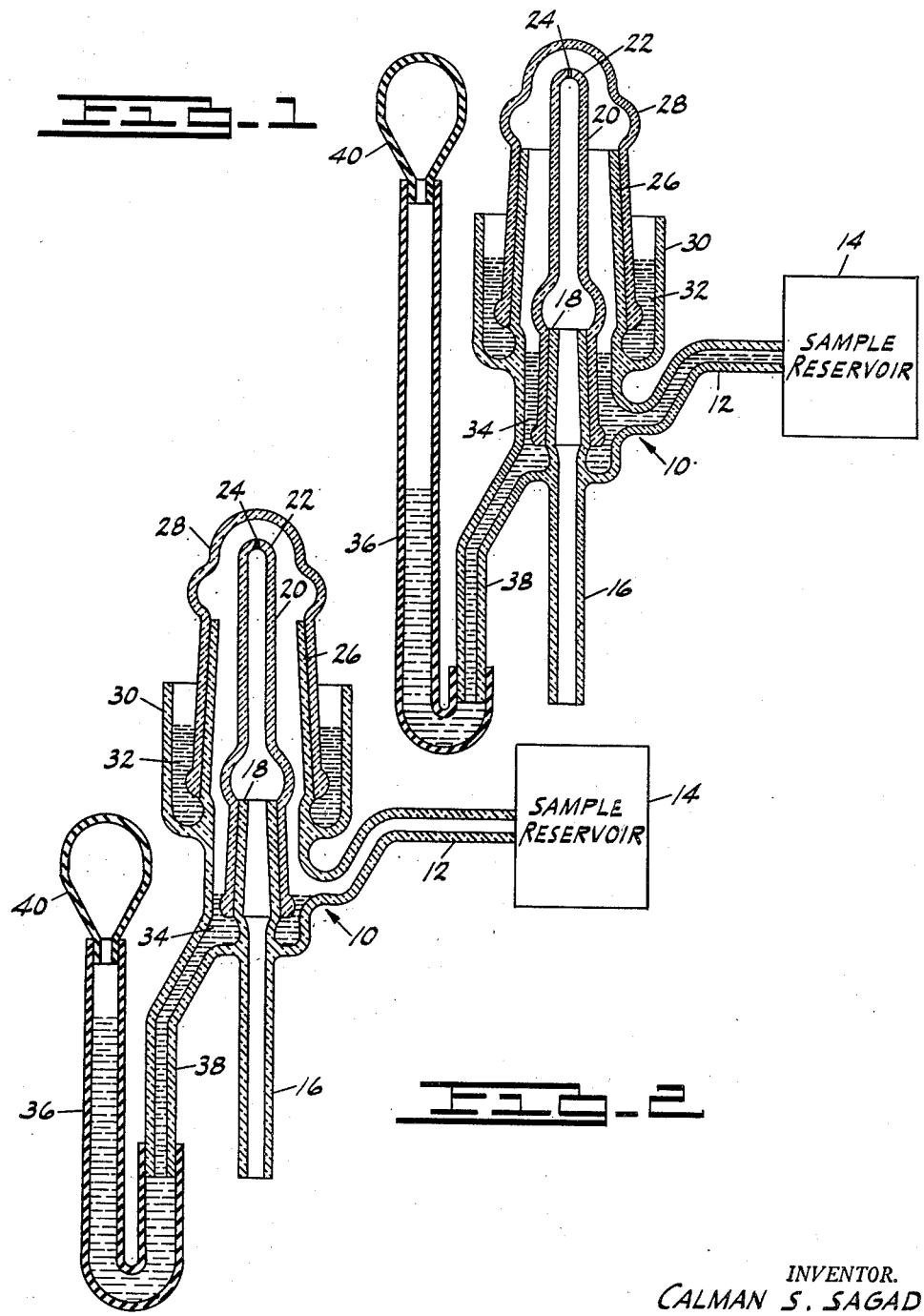

2,658,519

UNITED STATES PATENT OFFICE 2,658,519

LEAK VALVE

Calman S. Sagady, Ecorse, Mich., assignor to Bendix Aviation Corporation, Detroit, Mich., a corporation of Delaware Application July 9, 1951, Serial No. 235,737

4 Claims. (Cl. 137—253)

This invention relates to a valve for controlling the flow of a fluid and more particularly to a valve for controlling the flow of small amounts of a fluid.

In certain instruments, such as mass spectrometers, a small but known amount of fluid is admitted into the instrument for analysis. For example, some of the molecules of fluid admitted into a mass spectrometer are ionized and these ions are analyzed by the spectrometer to determine their mass or to determine their relative abundance if molecules of different gases are admitted simultaneously.

In order for such an instrument as a mass spectrometer to operate properly, a controlled amount of gas must be admitted into the spectrometer for analysis. The valves now in use employ a hole, or holes, of less than pinpoint diameter through which the gas is admitted. Because of the somewhat delicate operation of these valves, it has been difficult to cut them off completely after the proper amount of fluid has been admitted. Furthermore, the holes of pinpoint diameter tend to become blocked with foreign material after they have been in operation for some time, and the construction of the valves prevents the blocked parts from being easily and quickly removed and replaced by properly operating components.

This invention provides a valve in which the flow of fluid can be cut off by a simple movement of one component in the valve. The valve is so constructed that any defective component can be replaced without any trouble by a properly operating component. The valve is simple and sturdy in construction and reliable in operation.

An object of the invention is to control the flow of a relatively small quantity of fluid.

Another object of this invention is to provide a valve of the above character for preventing any leaks from developing during the flow of a relatively small quantity of fluid so that the fluid will not be contaminated by extraneous gases which leak into the valve from the atmosphere.

A further object is to provide a valve of the above character in which the flow of fluid can be cut off by a simple manipulation of one component in the valve.

Still another object is to provide a valve of the above character in which any component may be easily and quickly replaced in case it becomes defective.

A still further object is to provide a valve of the above character which is simple and sturdy in construction and reliable in operation.

Other objects and advantages will be apparent from a detailed description of the invention and from the appended drawings and claims.

In the drawings:

Figure 1 is a sectional view illustrating a valve constituting one embodiment of the invention when the valve is closed to prevent the passage of fluid; and Figure 2 is a sectional view similar to Figure 1, in which the valve is illustrated in its open position.

In one embodiment of the invention, a support member, generally indicated at 10, is provided. The support member 10 is made from glass or other suitable material and is substantially hollow. The member has a horizontally disposed inlet tube 12 extending into the support member at a position intermediate the top and bottom of the member. The tube 12 is connected to a sample reservoir 14 adapted to introduce a gas or a mixture of gases into the valve through the inlet tube 12.

An outlet tube 16 extends downwardly from the member 10 at a position below the inlet tube 12. A control tube 18 open at its upper end extends vertically upwardly from the juncture between the member 10 and the tube 16 and tapers inwardly as it extends upwardly. The control tube 18 has a smaller diameter than the portion of the support member 10 surrounding it.

An inverted tube 20 having a bottom portion tapered at the same angle as the tapered portion of the control tube 18 fits snugly on the control tube. The tube 20 also has a non-tapered portion which extends above the tapered portion and which terminates in a sealed end 22. A small hole 24 of less than pinpoint diameter—for example, having a diameter considerably less than 0.001 inch—is provided in the sealed end 22 of the tube 20, which may also be made from a suitable material such as glass.

A channel tube 26 extends upwardly from the support member 10 from a position somewhat above the inlet tube 12. The channel tube has a relatively large diameter so that it surrounds the non-tapered portion of the inverted tube 12. The tube 26 tapers inwardly as it extends upwardly to provide a close fit between it and a correspondingly tapered cap 28 made from a suitable material such as glass. The cap 28 is sealed at its upper end.

An upwardly disposed flange 30 extending from a position intermediate the inlet tube 12 and the bottom portion of the channel tube 26 is provided in the support member 10. The flange 30 has a diameter greater than the channel tube 26 and forms a trough for the reception of a suitable liquid 32, such as mercury. The mercury seals the juncture between the tapered portions of the channel tube 26 and the cap 28 and prevents extraneous gases from the atmosphere from leaking into the valve.

Mercury 34 also rests in the confined space between the control tube 18 and the surrounding wall of the support member 10. The mercury 34 is introduced into the confined space from a flexible tube 36 which is connected to a spout 38 extending from the support member 10 at a bottom position in the confined space. The flexible tube is continuous at its outer end with a bulbular portion 40.

When the bulbular portion 40 is raised sufficiently, the level of the mercury 34 in the support member 10 rises above the opening between the support member and the body portion of the inlet tube 12, as illustrated in Figure 1. This prevents any fluid from the reservoir 14 from flowing through the inlet tube 12 into the support member 10. Upon the lowering of the bulbular portion 40 to a predetermined position, such as shown in Figure 2, the level of the mercury falls below the opening between the tube 12 and the body portion of the member 10. Fluid then flows from the reservoir 14 through the inlet tube 12 into the confined space between the inverted tube 20 and the channel tube 26. From this confined space, the fluid flows through the small hole 24 into the inverted tube 20 and downwardly through the inverted tube and the control tube 18 into the outlet tube 16. The fluid flowing through the outlet tube 16 passes into an instrument (not shown), such as a mass spectrometer, for subsequent utilization.

The valve disclosed above has several important advantages. By a simple manipulation of the bulbular portion 40, the flow of fluid into the valve can be completely cut off. By another manipulation of the bulbular portion 40, the valve can be completely opened to the flow of fluid from the reservoir 14. The fluid flows through the valve without any leakage even though several joints between components exist in the valve.

The valve is so constructed that any part can be easily and quickly replaced. Probably the part requiring the most frequent replacement is the inverted tube 20. This replacement is sometimes necessary because the small hole 24 may become partly or completely blocked from contamination when the valve has been in use for some time. The replacement is necessary at other times to provide an inverted tube 20 with a hole 24 having a different size than that in the tube being used so as to vary the rate at which fluid passes through the valve from the reservoir 14. To remove an inverted tube 20 for replacement by a new tube providing efficient operation, the bulbular portion 40 is first lowered so that the level of the mercury 34 falls below the confined space between the control tube 18 and the body portion of the member 10. The cap 28 and inverted tube 20 are then removed and a new inverted tube is fitted onto the control tube 18. The cap 28 is then reinserted on the channel tube 26 to place the valve in condition for subsequent operation.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A leak valve, including, a support member, inlet and outlet tubes extending from the member, a control tube extending from the member and communicative with the outlet tube to establish a continuous circuit for the flow of fluid, a channel tube extending from the member, a cap adapted to seat on the channel tube to seal the tube, an inverted tube adapted to fit on the control tube in communication with the inlet tube, the tube being closed at one end, there being a hole of small diameter in the closed end of the inverted tube to provide a continuous circuit between the inlet and outlet tubes, and means operative in one position to open the inlet tube for communication with the inverted tube and in another position to close the inlet tube against such communication and in both positions to seal the juncture between the control tube and the inverted tube.

2. A leak valve, including, a support member, inlet and outlet tubes extending from the support member, a control tube extending from the support member in a direction to provide for the passage of a fluid between it and the outlet tube, an inverted tube adapted to seat on the control tube and being closed at one end, there being a hole of small width in the closed end of the control tube, means operative in conjunction with the inlet tube and the inverted tube to provide a sealed passageway for the flow of fluid from the inlet tube through the hole in the inverted tube and through the control tube to the outlet tube, means for sealing the juncture between the control tube and the inverted tube, and means operative in one position to adjust the level of the sealing means sufficiently to block the flow of fluid from the inlet tube to the hole in the inverted tube and in another position to adjust the level of the sealing means sufficiently to open the passageway between the inlet tube and the inverted tube for the flow of fluid.

3. A leak valve, including, a support member, inlet and outlet tubes extending from the support member, a control tube extending from the support member in a direction to provide for the passage of a fluid between it and the outlet tube, an inverted tube adapted to seat on the control tube to form a juncture with the control tube below the inlet tube, the inverted tube being closed at the end opposite from its juncture with the inlet tube, there being a hole of small width in the closed end of the inverted tube, means operative in conjunction with the inlet tube and the inverted tube to provide a sealed passageway for the flow of fluid from the inlet tube through the hole in the inverted tube and through the control tube to the outlet tube, a liquid adapted to seal the juncture between the inverted tube and the control tube, and means operative in one position to raise the level of liquid above the inlet tube to block the flow of fluid from the inlet tube to the hole in the inverted tube and in another position to lower the level of the liquid below the inlet tube for the passage of the fluid.

4. A leak valve, including, a support member, inlet and outlet tubes extending from the member, a control tube extending from the member and communicative with the outlet tube to establish a continuous circuit for the flow of fluid, a channel tube extending from the support member, a cap adapted to seat on the channel tube to seal the tube, an upturned flange extending from the member adjacent the channel tube to form a trough, a liquid adapted to lie in the trough to seal the juncture between the cap and the channel tube, an inverted tube adapted to fit on the control tube in communication with the inlet tube, the inverted tube being closed at one end, there being a hole of small diameter in the closed end of the inverted tube to provide a continuous circuit between the inlet and outlet tubes, a liquid adapted to lie in the support member adjacent the control tube and the inverted tube to seal the juncture between the tubes, and means operative in one position to raise the level of the liquid above the inlet tube to prevent communication between the inlet and outlet tubes and in another position to lower the level of the liquid for the establishment of such communication.

CALMAN S. SAGADY.

References Cited in the file of this patent

UNITED STATES PATENTS

| Number | Name | Date |
|---|---|---|
| 846,078 | Wood | Mar. 5, 1907 |
| 2,280,499 | Perkins | Apr. 21, 1942 |
| 2,591,197 | Rau | Apr. 1, 1952 |

FOREIGN PATENTS

| Number | Country | Date |
|---|---|---|
| 554,516 | Germany | of 1927 |